(12) United States Patent
Payeur et al.

(10) Patent No.: US 11,981,977 B2
(45) Date of Patent: May 14, 2024

(54) OPTICAL SYSTEM AND METHOD FOR METALLURGICAL EXTRACTION AND REFINING

(71) Applicant: INSTITUT NATIONAL DE LA RECHERCHE SCIENTIFIQUE, Québec (CA)

(72) Inventors: Stéphane Payeur, Montréal (CA); François Légaré, St-Eustache (CA); Jean-Claude Kieffer, Montréal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 622 days.

(21) Appl. No.: 17/248,038

(22) Filed: Jan. 6, 2021

(65) Prior Publication Data
US 2021/0207242 A1 Jul. 8, 2021

Related U.S. Application Data

(60) Provisional application No. 62/957,433, filed on Jan. 6, 2020.

(51) Int. Cl.
*C22B 4/08* (2006.01)
*B23K 26/0622* (2014.01)
(Continued)

(52) U.S. Cl.
CPC ............ *C22B 4/08* (2013.01); *B23K 26/0624* (2015.10); *B23K 26/40* (2013.01); *G02B 27/0927* (2013.01)

(58) Field of Classification Search
CPC ...... C22B 4/08; B23K 26/0624; B23K 26/40; G02B 27/0927; H01J 49/164; H01J 49/30; Y02P 10/20
(Continued)

(56) References Cited

U.S. PATENT DOCUMENTS 4,176,025 A 11/1979 Chen et al.
4,199,685 A 4/1980 Hora et al.
(Continued)

FOREIGN PATENT DOCUMENTS

WO 1995027587 A1 10/1995

OTHER PUBLICATIONS

Mishin, et al ("Chemically Selective Laser Ion-Source For The CERN-ISOLDE On-Line Mass Separator Facility," European Organization for Nuclear Research, CERN-PPE/92-221, Dec. 17, 1992 (Year: 1992).*
(Continued)

*Primary Examiner* — Michael Maskell
(74) *Attorney, Agent, or Firm* — LAVERY, DE BILLY, LLP; Gwendoline Bruneau

(57) ABSTRACT

A method and a system, the system, comprising a laser source, a ionization and acceleration unit, a separation unit, and a collecting unit, wherein the laser source comprises a large bandwidth laser delivering successive pulses of fixed central wavelength and bandwidth to a surface of a target positioned inside the ionization and acceleration unit, surface atoms of the target being ionized by the pulses, accelerated from the surface of the target to a kinetic energy in the range between 100 eV and 10 KeV, and focused to the separation unit, the separation unit separating received atoms into different ions species, and the collecting unit separately collecting the different ion species. The method comprises positioning a target inside a resistive tube, delivering successive pulses of same selected wavelength and bandwidth from a large bandwidth laser generating a beam of fixed central wavelength and bandwidth to a surface of the target to ionize atoms of the surface of the target, accelerate the ionized atoms to a kinetic energy in a range between 100 eV and 10 KeV, under an electric field in a resistive tube, (Continued)

directing the ionized atoms to a magnetic separator, and collecting ions species of the target separately in cup collectors.

20 Claims, 4 Drawing Sheets

(51) Int. Cl.
*B23K 26/40* (2014.01)
*G02B 27/09* (2006.01)

(58) Field of Classification Search
USPC .......................................... 250/281, 282, 288
See application file for complete search history.

(56) References Cited

U.S. PATENT DOCUMENTS

| | | | | |
|---|---|---|---|---|
| 5,164,592 | A | * | 11/1992 | Kitamori ............... H01J 49/164 |
| | | | | 250/281 |
| 5,656,186 | A | | 8/1997 | Mourou et al. |
| 5,948,214 | A | | 9/1999 | Bailey |
| 6,552,301 | B2 | | 4/2003 | Herman et al. |
| 6,586,696 | B1 | * | 7/2003 | Pronko ................... B01D 59/44 |
| | | | | 204/157.22 |
| 6,787,723 | B2 | * | 9/2004 | Pronko ................... B01D 59/44 |
| | | | | 204/157.2 |
| 2019/0074170 | A1 | * | 3/2019 | Doroshenko ......... H01J 49/164 |

OTHER PUBLICATIONS

Photonis, "FieldMaster™ Resistive Glass Products," Photonis USA Inc., 2010.
Photonis, "Spiraltron™ Electron Multipliers," Photonis USA, 2010.
Supermagnete, "Frequently Asked Questions," supermagnete, [Online]. Available: https://www.supermagnete.de/eng/faq/Does-a-magnet-weaken-over-time.
Chemwiki, Jan. 6, 2016. [Online]. Available: http://chemwiki.ucdavis.edu/Core/Physical_Chemistry/Kinetics/Rate_Laws/Gas_Phase_Kinetics/Mean_Free_Path. Last updated: Aug. 21, 2020.
M. Chaplin, Jul. 14, 2016. [Online]. Available: http://www1.lsbu.ac.uk/water/water_molecule.html. Last updated: Jul. 30, 2020.
webelements.com, "WebElements," [Online]. Available: https://www.webelements.com/uranium/atom_sizes.html.
Mt-Berlin, "Crystal Quartz (SiO2) and Fused Silica," [Online]. Available: http://www.mt-berlin.com/frames_cryst/descriptions/quartz%20.htm.
Liang et al., "Role of ablation and incubation processes on surface nanograting formation," Optical Society of America, Quebec, 2011.
Darlinga et al., "Micromachined Faraday cup array using deep reactive ion etching," Elsevier, 2002.
Hyperphysics, "Magnetic Force," [Online]. Available: http://hyperphysics.phy-astr.gsu.edu/hbase/magnetic/magfor.html.
Hyperphysics, "Mass Spectrometer," [Online]. Available: http://hyperphysics.phy-astr.gsu.edu/hbase/magnetic/maspec.html.
McKenna et al., "Threshold displacement energy and damage function in graphite from molecular dynamics," Elsevier, Apr. 2016.
Busch, "Detecting Ions in Mass Spectrometers with the Faraday Cup," [Online]. Available: http://www.spectroscopyonline.com/detecting-ions-mass-spectrometers-faraday-cup.
Komashko et al., "Simulation of material removal efficiency with ultrashort laser pulses", Appl. Phys. A 69 [Suppl.], S95-S98, Springer-Verlag (1999).
Gamaly et al., "Ultrafast Laser Ablation and Film Deposition", (chapter 5), Mar. 2006, ResearchGate.
"Pulsed Laser Deposition of Thin Films: Applications-Led Growth of Functional Materials". Edited by Robert Eason, John Wiley & Sons, Inc., 2007.
Mrotek et al., "Characterization of the Uniformity and Stability of Resistive Glass", BURLE, A Photonis Group Company.
Laprade et al., BURLE Electro-Optics, "The Development of Novel Resistive Glass Technology to Simplify Ion Reflector Lenses, Ion Guides, Drift Tubes and lon Source Designs in Analytical Instruments", Photonis Scientific Detectors, 2004.
Photonis Scientific Detectors. "Portable Dynamic Detectors. SpiraltronTM Electron Multipliers", Photonis USA, Inc., 2017.
Zweben et al., "Plasma mass separation", Physics of Plasmas 25, 090901 (2018), AIP Publishing.
Stéphane Payeur, Additional drawing_Patent, Dec. 13, 2019.
Mishin et al., "Chemically Slective Laser Ion-Source for the Cern-Isolde On-Line Mass Separator Facility", European Organization for Nuclear Research, CERN-PPE/92-221, Dec. 17, 1992.
Gertus et al., "Flat-Top Converter I Top Hat", WOP Workshop of Photonics, 2020 Altechna R&D.
Gamaly et al., "Ablation of metals with picosecond laser pulses: Evidence of long-lived nonequilibrium conditions at the surface", Physical Review B 71, 174405 (2005).
Wang et al., "Ion kinetic energy distributions in laser-induced plasma", Spectrochimica Acta Part B 99 (2014) 101-114, Elsevier B.V. 2014.
Krishnan et al., "Plasma Centrifuge", Physcial Review Letters, vol. 46, No. 1, 1981.

* cited by examiner

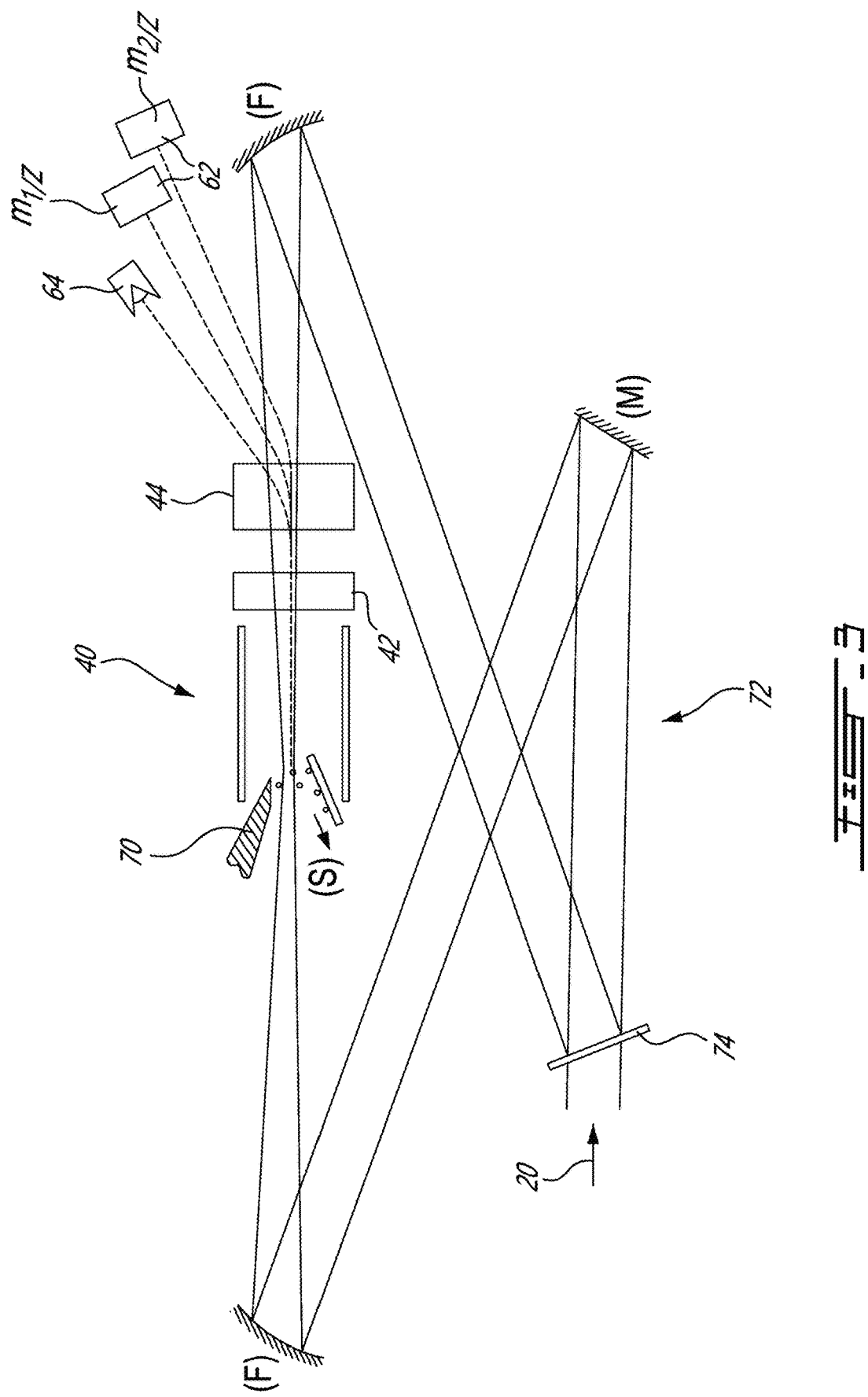

OPTICAL SYSTEM AND METHOD FOR METALLURGICAL EXTRACTION AND REFINING

CROSS REFERENCE TO RELATED APPLICATIONS

This application claims benefit of U.S. provisional application Ser. No. 62/957,433, filed on Jan. 6, 2019. All documents above are incorporated herein in their entirety by reference.

FIELD OF THE INVENTION

The present invention relates to metallurgical extraction and refining. More specifically, the present disclosure is concerned with an optical system and for metallurgical extraction and refining.

BACKGROUND OF THE INVENTION

Extraction and refining of pure metals/elements from raw materials or compounds ore typically involve a large furnace infrastructures and generate secondary chemical wastes. Large furnaces are energy consuming and take a long time to ramp-up for production. Chemical wastes can lead to environmental issues, for example soil contamination or air pollution.

Extraction and refining can be achieved by one or a combination of a number of metallurgical processes, including hydrometallurgy, electrometallurgy and pyrometallurgy, and by methods for isotope enrichment. These metallurgical processes use heat and chemical reactions, where heat and thus energy are wasted, and chemical wastes are generated. A number of processing stages or steps are generally needed to obtain final elements of high purity, i. e. typically superior to 3N. State-of-the-art methods for isotope enrichment have a very low output and are time consuming.

There is still a need in the art for a method and system for metallurgical extraction and refining.

SUMMARY OF THE INVENTION

More specifically, in accordance with the present invention, there is provided a system, comprising a large bandwidth laser source, a ionization and acceleration unit, a separation unit, and a collecting unit, wherein the laser source delivers successive pulses of fixed central wavelength and bandwidth to a surface of a target positioned inside the ionization and acceleration unit, surface atoms of the target being ionized by the pulses, accelerated from the surface of the target and focused to the separation unit, the separation unit separating received atoms into different ions species, and the collecting unit separately collecting the different ion species.

There is further provided a method comprising delivering successive pulses of same selected wavelength and bandwidth from a large bandwidth laser source generating a beam of fixed central wavelength and bandwidth to a surface of the target to ionize atoms of the surface of the target, accelerate the ionized atoms under an electric field, directing the ionized atoms to a magnetic separator, and collecting ions species of the target separately.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 3 is a schematic view of a system according to an embodiment of an aspect of the present disclosure;

DESCRIPTION OF ILLUSTRATIVE EMBODIMENTS

The present invention is illustrated in further details by the following non-limiting examples.

Figure 1:
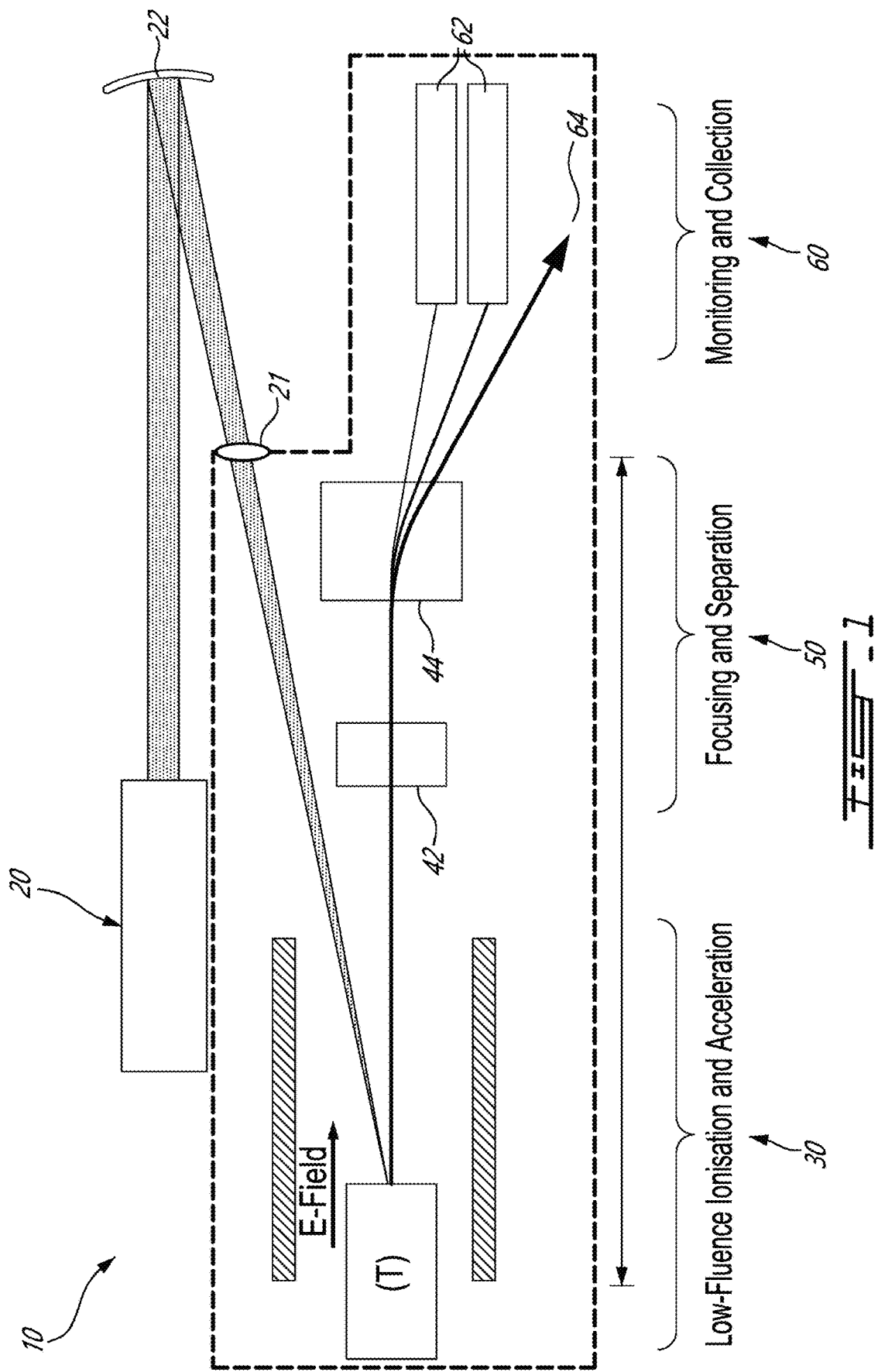
FIG. 1 is a schematic view of a system according to an embodiment of an aspect of the present disclosure.

A system of the present disclosure as illustrated for example in FIG. 1 generally comprises a laser source 20, a ionization and acceleration unit 30, a separation unit 50 and a collecting unit 60.

The laser source 20 is a large bandwidth laser source of laser beams of fixed central wavelength and bandwidth. Successive pulses of same selected wavelength and bandwidth are directed by focusing optics 22 to the surface of a target (T) positioned inside a resistive tube 40 of the ionization and acceleration unit 30. The pulse duration and energy may be selectively varied.

The units of the system are positioned in vacuum (see vacuum chamber in dashed line in FIG. 1, for example) to minimize collision with environmental molecules or atoms, in such a way that the mean free path of the ions is longer than the ions path length. A vacuum of about $1.10^{-3}$ Torrs is selected for a mean free path of about 5 cm and vacuum of about $1.10^{-5}$ Torrs for a mean free path of about 500 cm for example. A vacuum tight optical port 21 lens for the laser beam, such as a thin glass plate transparent to the laser pulse, of low dispersion, which withstands vacuum pressure, is selected in such a way as not to broaden the pulse duration by more than about 10. A plate of fused silica of a thickness in the range between about 3 and about 5 mm may be used in case of an optical port 21 of a diameter of 50 mm for example.

Atoms ionized from the surface of the target (T) are accelerated under a longitudinal field generated in the resistive tube 40, from an initial kinetic energy, typically lower than about 10 eV, to a kinetic energy in the range of at least 100 eV, for example in the range between about 100 eV and about 10 KeV, or even higher than 10 KeV depending on the resistive tube. It is to be noted that the target is not pre-heated for ionization, i.e. there is no in vacuum-heating elements.

In the separation unit 50, the beam of ionized species is focused by an electric field lens 42 to a magnetic separator 44. The magnetic separator 44 separates the beam of ionized species into its different ions species.

The different ion species of the target (T) thus separated can then be received by the collecting unit 60 for collection of each one of them separately.

The laser source 20 may be a large bandwidth ultrashort pulsed laser, delivering a beam of energy in the range between about $10^{10}$ W/cm$^2$ and about $10^{13}$ W/cm$^2$ on the surface of the target. The average power is of at least 500 W, for example of about 1 KW, temporal duration is comprised in the range between about 2 femtoseconds and about 10 picoseconds and the repetition rate is greater than 100 kHz, for example greater than 500 kHZ, for example greater than 1 MHz, with pulses of energy in the range between about 1 microjoules and about 100 microjoules.

The focusing optics 22 may be a lens or a focusing mirror for example. The laser beam may be spatially modulated by a beam shaping optic to obtain an energy top hat distribution on the surface of the target for example.

The resistive tube 40 may be selected as a resistive glass tube of a length of 10 cm with a potential of 4000V to generate a longitudinal electric field of 400V/cm for example.

The potential voltage of the electric field lens 42, such as an Einzel lens, is selected to focalize the ion beam to the collecting unit 60. The potential on the Einzel lens for focusing stainless steel ions used in experiments described herein was 1458 Volts.

The magnetic separator 44 deviates the ion beam received from the ionization and acceleration unit 30 by the Lorentz force. The deviation is unique for each unified atomic mass unit AMU (m) for a single ionization state. Deviation with a magnetic force of 51.3 mTesla was used for stainless steel in experiments described herein. The collecting unit may comprise a cup collector 64 to receive an ion species selected as not worth recovering as a value element, such as hydrogen or oxygen for example, used as a reference for calibrating the m/z separating efficiency of the system. The m/z (mass-to-charge ratio (m/Q or m/z) separating efficiency of the system may thus be monitored in real time, for example by adjusting the laser energy, laser repetition rate, beam alignment, positioning of the target inside the resistive tube, and the electric and magnetic fields, to obtain minimal distortion of the ion trajectories, for example.

The collecting unit 60 typically comprises cup collectors 62.

The laser energy is selected in the range between about 1 and about 3 times the ionization threshold of the surface atoms of the target (T) to minimize accelerating forces on the ions. The ionization threshold is defined as the critical fluence (optical energy per area per pulse) required to produce charged ions by transferring an amount of energy to a bound electron. The beam, the target inside the resistive tube and collectors are aligned so that the ions are directed by the electromagnetic fields to the collectors. The position of the target (T) is along the Z-axis inside the resistive tube is selected and fixed to keep the acceleration length constant inside the resistive tube, defined as the distance between the surface of the target and the output of the resistive tube, and which determines the kinetic energy of the ions emerging from the ionization and acceleration unit 30. The target (T) may be moved along the x and y axis so as to expose different parts of its surface, depending on the target size and the size of the laser beam. The laser repetition rate is selected to obtain maximum yield with ions having low emittance. The electric and magnetic fields may be adjusted in real time using a reference ion species as mentioned hereinabove. The laser high average power and high repetition rate laser allow to obtain high yield.

The target (T) may be gaseous, liquid or a solid of a combination of elements such as oxides, mineral ores, metal alloys, metals, non-metals for example. TaO$_2$ and stainless steel targets were tested as part of the present disclosure.

The laser-matter interaction atomizes the surface of the target into its plurality of elements. The target (T) is located inside the resistive tube at a distance from the output of the resistive tube in such a way that the extracted ions are accelerated in the longitudinal direction (x-axis) of the system as described hereinabove.

Figure 4B:
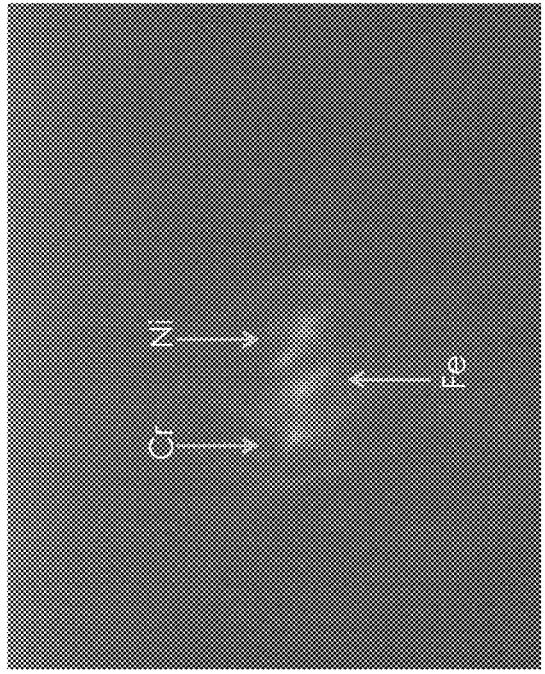
FIG. 4B shows separation of elements of a stainless-steel target with magnetic separation according to an embodiment of an aspect of the present disclosure.
Figure 4A:
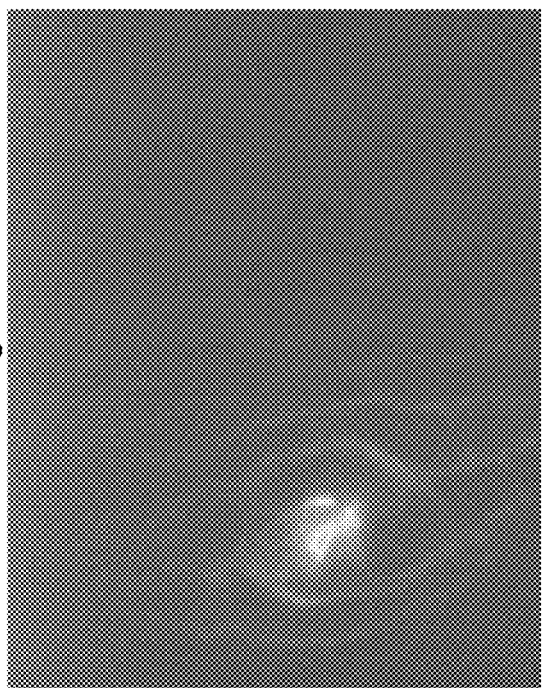
FIG. 4A shows separation of elements of a stainless-steel target without magnetic separation.

FIG. 4 show separation of chrome (52 amu), iron (56 amu) and nickel (58 amu/60 amu) of a stainless-steel target, without ion magnetic separation (see FIG. 4A) and with ion magnetic separation (see FIG. 4B).

The system is shown to efficiently extract ions layer by layer from the surface of the target, separate the different ion species in a cross magnetic field by mass-to-charge ratio (m/Q or m/z), and separately recover pure elements from the target.

The laser field is selected to allow a controlled acceleration and focalisation of the ions. The laser beam fluence on the target is controlled to be at the ionization threshold, typically in the range between about 1 and about 300 mJ/cm$^2$ depending of the composition of the target and the laser pulse properties, including temporal duration. A high repetition rate ultrashort pulsed laser, of at least 100 kHz, with a pulse duration in the range between about 2 femtoseconds and about 10 picoseconds, are selected.

A laser beam top-hat beam profile and/or a target of a size smaller than the laser beam waist at the laser/target interaction plane may be selected to achieve uniform fluence across the laser-target interaction region and thus increase the initial velocity uniformity of the extracted ions.

A short pulse high mean average power of at least 500 W, high repetition rate of at least 100 KHz, laser is used to yield a laser generated electric field corresponding to the ionization threshold of the elements of the target so as to achieve ionization of the elements of the target by multiphoton ionization, tunneling ionization or over-the-barrier ionization, while imparting minimum kinetic energy to the extracted ions.

One or a number of laser beams may be selected for fluence optimization, in such a way to obtain a fluence high enough to maximize atomization on the surface of the target. A maximized ratio of atomization, defined as the number of single atomic ions in the total amount of atoms including single atomic ions and ion clusters extracted from the target surface, is achieved at high repetition rates, greater than about 100 kHz, and low fluence laser ionization, in the range between about 1 and about 300 mJ/cm$^2$.

The present method and system may be used for metallurgical extraction and refining with efficient output rate, greater than 10 g per hour or $5 \cdot 10^{23}$ atoms per hour. Solid targets composed of a plurality of elements may thus be valorised into valuable elements, by atomizing the ions of each such element, accelerate them on distinct trajectories and selectively collect them once thus separated. Solid targets composed of oxides, mineral ores, metal alloys, metals, non-metal for example may thus be valorised into their valuable elements. Other targets such as gas or liquid can also be thus processed.

There is thus provided an optically-based system consisting of optical and electromagnetic elements for separation and purification of elements from raw materials. Thus metals and non-metals may be recovered from mineral ores, oxides, sulfides, and chemical wastes for example, with reduced waste, using an ultrashort laser beam atomizing raw materials by threshold fluence laser ionization, atomised ions accelerated by an electric potential being directed to a magnetic separation.

Figure 2:
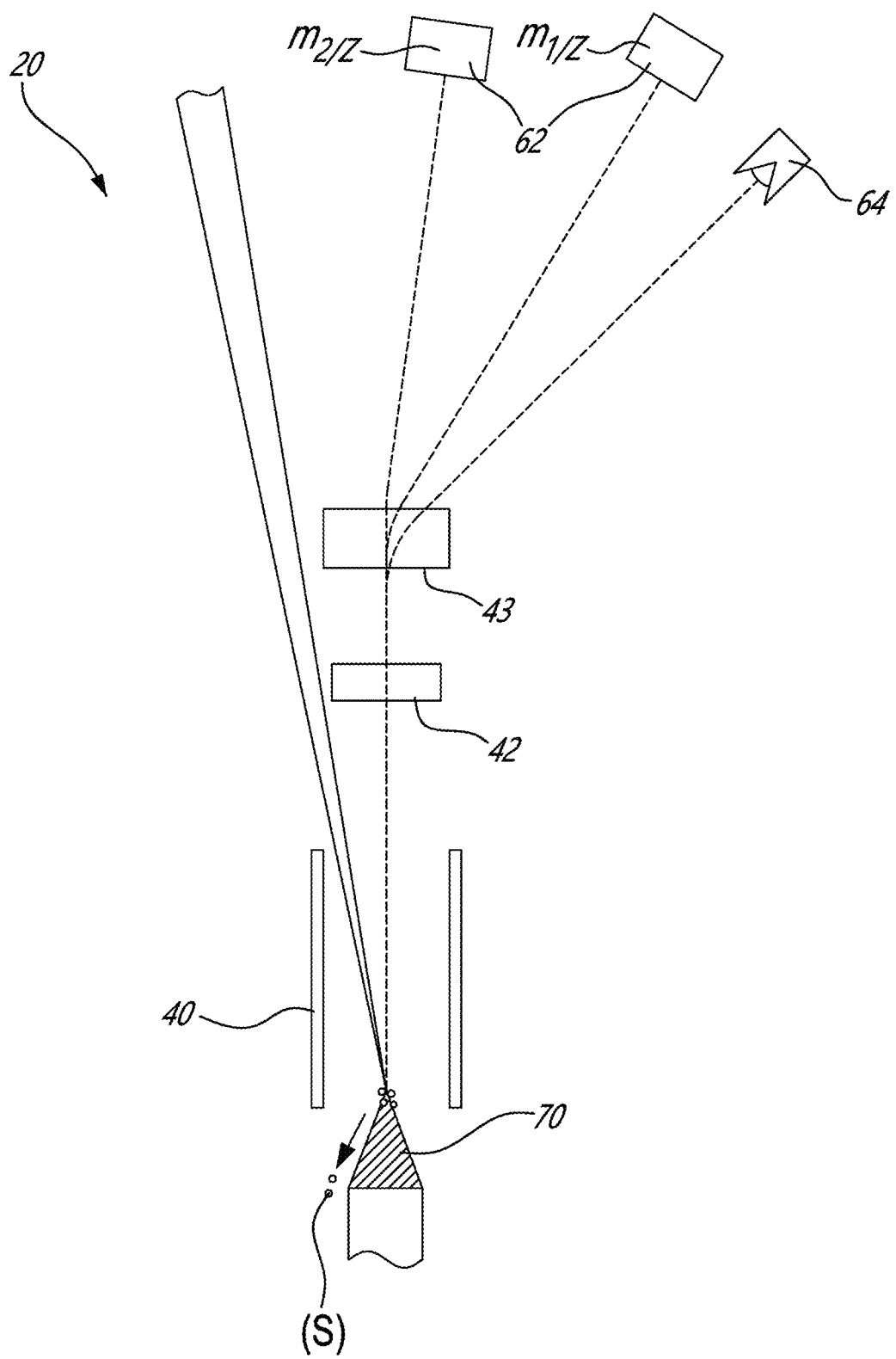
FIG. 2 is a schematic view of a system according to an embodiment of an aspect of the present disclosure.

In a vertical configuration of the system illustrated for example in FIG. 2, the laser beam is directed to the target (T) inside the resistive tube 40 from above. In case of a powder target for instance, the powder (P) may thus be fed from below to a nozzle 70 for interaction with the laser beam, spilling (S) of unprocessed powder falling out by gravity.

In a system illustrated for example in FIG. 3, an enhancement cavity 72 is used for enhancement of the laser beam intensity and reinjection into the system for interaction with the target. The laser beam is directed to the enhancement cavity 72 using an input coupler 74 and a mirror (M) at the output of the enhancement cavity 72 and the enhanced laser beam is directed to the resistive tube 40 through the nozzle 70.

The method comprises controlled injection of ions extracted from a compound target at their ionization threshold energy as provided by a short pulse high power laser beam, in such a way that the generated ions have a minimised emittance and initial energy below 10 eV, in an accelerating field. For example, a high repetition rate ultrashort laser pulse of 10 picosecond and less may be used to ionize ions from the target surface with initial energies below 10 eV, for example below 1 eV, and in a subsequent accelerating field from about 100 eV to about 10 KeV for example.

The scope of the claims should not be limited by the embodiments set forth in the examples but should be given the broadest interpretation consistent with the description as a whole.

REFERENCES

1. Z. Song, Handbook of 3D machine vision: optical metrology and imaging (2013), Vol. Chapter 9.
2. J.-A. Beraldin, F. Blais, P. Boulanger, L. Cournoyer, J. Domey, S. El-Hakim, G. Godin, M. Rioux, and J. Taylor, "Real world modelling through high resolution digital 3D imaging of objects and structures," ISPRS Journal of Photogrammetry and Remote Sensing 55, 230-250 (2000).
3. J. Stegmaier, F. Amat, W. C. Lemon, K. McDole, Y. Wan, G. Teodoro, R. Mikut, and P. J. Keller, "Real-time three-dimensional cell segmentation in large-scale microscopy data of developing embryos," Developmental cell 36, 225-240 (2016).
4. S. Seer, N. Brändle, and C. Ratti, "Kinects and human kinetics: A new approach for studying pedestrian behavior," Transportation Research Part C 48, 212-228 (2014).
5. M. Gosta and M. Grgic, "Accomplishments and challenges of computer stereo vision," in Proceedings ELMAR-2010, (IEEE, 2010), 57-64.
6. M. Hansard, S. Lee, O. Choi, and R. P. Horaud, Time-of-flight cameras: principles, methods and applications (Springer Science & Business Media, 2012).
7. S. Zhang, "Recent progresses on real-time 3D shape measurement using digital fringe projection techniques," Optics and lasers in engineering 48, 149-158 (2010).
8. S. Zhang, "Absolute phase retrieval methods for digital fringe projection profilometry: A review," Optics and Lasers in Engineering 107, 28-37 (2018).
9. J. Geng, "Structured-light 3D surface imaging: a tutorial," Adv. Opt. Photon. 3, 128-160 (2011).
10. C. Zuo, S. Feng, L. Huang, T. Tao, W. Yin, and Q. Chen, "Phase shifting algorithms for fringe projection profilometry: A review," Optics and Lasers in Engineering 109, 23-59 (2018).
11. S. S. Gorthi and P. Rastogi, "Fringe projection techniques: whither we are?," Optics and lasers in engineering 48, 133-140 (2010).
12. L. J. Hornbeck, "Digital light processing for high-brightness high-resolution applications," in Projection Displays III, (International Society for Optics and Photonics, 1997), 27-41.
13. X. Su and Q. Zhang, "Dynamic 3-D shape measurement method: a review," Optics and Lasers in Engineering 48, 191-204 (2010).
14. M. Vázquez-Arellano, H. Griepentrog, D. Reiser, and D. Paraforos, "3-D imaging systems for agricultural applications—a review," Sensors 16, 618 (2016).
15. B. Li and S. Zhang, "Novel method for measuring a dense 3d strain map of robotic flapping wings," Measurement Science and Technology 29, 045402 (2018).
16. B. Li and S. Zhang, "Superfast high-resolution absolute 3D recovery of a stabilized flapping flight process," Optics express 25, 27270-27282 (2017).
17. S. Van der Jeught and J. J. Dirckx, "Real-time structured light profilometry: a review," Optics and Lasers in Engineering 87, 18-31 (2016).
18. S. Zhang, "High-speed 3D shape measurement with structured light methods: A review," Optics and Lasers in Engineering 106, 119-131 (2018).
19. Y. Wang, J. I. Laughner, I. R. Efimov, and S. Zhang, "3D absolute shape measurement of live rabbit hearts with a superfast two-frequency phase-shifting technique," Optics express 21, 5822-5832 (2013).
20. C. Zuo, T. Tao, S. Feng, L. Huang, A. Asundi, and Q. Chen, "Micro Fourier Transform Profilometry (μFTP): 3D shape measurement at 10,000 frames per second," Optics and Lasers in Engineering 102, 70-91 (2018).
21. Y. Wang and S. Zhang, "Three-dimensional shape measurement with binary dithered patterns," Applied optics 51, 6631-6636 (2012).
22. J.-S. Hyun, B. Li, and S. Zhang, "High-speed high-accuracy three-dimensional shape measurement using digital binary defocusing method versus sinusoidal method," Optical Engineering 56, 074102 (2017).
23. B. Li, Y. Wang, J. Dai, W. Lohry, and S. Zhang, "Some recent advances on superfast 3D shape measurement with digital binary defocusing techniques," Optics and Lasers in Engineering 54, 236-246 (2014).
24. S. Lei and S. Zhang, "Flexible 3-D shape measurement using projector defocusing," Optics letters 34, 3080-3082 (2009).
25. J. Liang, R. N. Kohn Jr, M. F. Becker, and D. J. Heinzen, "High-precision laser beam shaping using a binary-amplitude spatial light modulator," Appl. Opt. 49, 1323-1330 (2010).
26. T. D. Han and T. S. Abdelrahman, "hiCUDA: High-level GPGPU programming," IEEE Transactions on Parallel and Distributed systems 22, 78-90 (2010).
27. K. L. Chung, S. C. Pei, Y. L. Pan, W. L. Hsu, Y. H. Huang, W. N. Yang, and C. H. Chen, "A gradient-based adaptive error diffusion method with edge enhancement," Expert Systems with Applications 38, 1591-1601 (2011).
28. D. C. Ghiglia and L. A. Romero, "Robust two-dimensional weighted and unweighted phase unwrapping that uses fast transforms and iterative methods," JOSA A 11, 107-117 (1994).
29. D. C. Ghiglia and M. D. Pritt, Two-dimensional phase unwrapping: theory, algorithms, and software (Wiley New York, 1998), Vol. 4.
30. https://developer.nvidia.com/cufft.

31. W.-X. Huang and H. J. Sung, "Three-dimensional simulation of a flapping flag in a uniform flow," Journal of Fluid Mechanics 653, 301-336 (2010).
32. D. Waide, "The Future of Machine Vision Standards," Quality, 19VS (2017).
33. J.-S. Hyun and S. Zhang, "Enhanced two-frequency phase-shifting method," Applied optics 55, 4395-4401 (2016).
34. K. Zhong, Z. Li, X. Zhou, Y. Li, Y. Shi, and C. Wang, "Enhanced phase measurement profilometry for industrial 3D inspection automation," The International Journal of Advanced Manufacturing Technology 76, 1563-1574 (2015).
35. A. Chatterjee, P. Singh, V. Bhatia, and S. Prakash, "Ear biometrics recognition using laser biospeckled fringe projection profilometry," Optics & Laser Technology 112, 368-378 (2019).
36. M. Akutsu, Y. Oikawa, and Y. Yamasaki, "Extract voice information using high-speed camera," in Proceedings of Meetings on Acoustics ICA2013, (ASA, 2013), 055019.
37. S. Banerjee, B. S. Connell, and D. K. Yue, "Three-dimensional effects on flag flapping dynamics," Journal of Fluid Mechanics 783, 103-136 (2015).
38. M. J. Shelley and J. Zhang, "Flapping and bending bodies interacting with fluid flows," Annual Review of Fluid Mechanics 43, 449-465 (2011).
39. Y. Watanabe, K. Isogai, S. Suzuki, and M. Sugihara, "A theoretical study of paper flutter," Journal of Fluids and Structures 16, 543-560 (2002).
40. G. W. Taylor, J. R. Burns, S. Kammann, W. B. Powers, and T. R. Welsh, "The energy harvesting eel: a small subsurface ocean/river power generator," IEEE journal of oceanic engineering 26, 539-547 (2001).
41. B. S. Connell and D. K. Yue, "Flapping dynamics of a flag in a uniform stream," Journal of fluid mechanics 581, 33-67 (2007).
42. S. Michelin, S. G. L. Smith, and B. J. Glover, "Vortex shedding model of a flapping flag," Journal of Fluid Mechanics 617, 1-10 (2008).
43. S. Alben and M. J. Shelley, "Flapping states of a flag in an inviscid fluid: bistability and the transition to chaos," Physical review letters 100, 074301 (2008).
44. J. Zhang, S. Childress, A. Libchaber, and M. Shelley, "Flexible filaments in a flowing soap film as a model for one-dimensional flags in a two-dimensional wind," Nature 408, 835 (2000).
45. M. Shelley, N. Vandenberghe, and J. Zhang, "Heavy flags undergo spontaneous oscillations in flowing water," Physical review letters 94, 094302 (2005).
46. M. Argentina and L. Mahadevan, "Fluid-flow-induced flutter of a flag," Proceedings of the National Academy of Sciences 102, 1829-1834 (2005).
47. A. Manela and M. Howe, "On the stability and sound of an unforced flag," Journal of Sound and Vibration 321, 994-1006 (2009).

The invention claimed is:

1. A system for separation of elements of a target, comprising:
a large bandwidth laser source of energy selected in a range between 1 and about 3 times a ionization threshold of elements of the target;
a ionization and acceleration unit;
a separation unit; and
a collecting unit,
wherein the laser source delivers successive pulses of fixed central wavelength and bandwidth to the target positioned inside the ionization and acceleration unit; the elements of the target being ionized by the pulses, accelerated from the target, and focused to the separation unit; the separation unit separating received elements into different ions species; and the collecting unit separately collecting the different ion species.

2. The system of claim 1, wherein the ionization and acceleration unit comprises a resistive tube, and the elements of the target ionized by the pulses are accelerated from the target from a kinetic energy lower than 10 eV.

3. The system of claim 1, wherein the target is positioned along a Z-axis in a resistive tube in the ionization and acceleration unit.

4. The system of claim 1, wherein the target is fixedly positioned along a Z-axis in a resistive tube in the ionization and acceleration unit, the target being mobile along x and y axes, and the pulses from the laser source, the target inside the resistive tube and collectors of the collecting unit are aligned.

5. The system of claim 1, wherein the collecting unit comprises a collector to receive a ion species of the target selected as a reference.

6. The system of claim 1, wherein the collecting unit comprises a collector to receive a ion species of the target selected as a reference, electric and magnetic fields in the system being adjusted in real time using the reference.

7. The system of claim 1, wherein the laser source is a large bandwidth ultrashort pulsed laser source, delivering an energy on the target in a range between $10^{10}$ W/cm$^2$ and $10^{13}$ W/cm$^2$, of average power of at least 500 W, temporal duration in a range between 2 femtoseconds and 10 picosecond and repetition rate greater than 100 kHz, with pulses of energy in a range between 1 microjoules and 100 microjoules.

8. The system of claim 1, wherein the laser source is a large bandwidth ultrashort pulsed laser source, delivering an energy on the target in a range between $10^{10}$ W/cm$^2$ and $10^{13}$ W/cm$^2$, of average power of at least 500 W, temporal duration in a range between 2 femtoseconds and 10 picosecond and repetition rate greater than 500 kHZ, with pulses of energy in a range between 1 microjoules and 100 microjoules.

9. The system of claim 1, wherein the laser source is a large bandwidth ultrashort pulsed laser source, delivering an energy on the target in a range between $10^{10}$ W/cm$^2$ and $10^{13}$ W/cm$^2$, of average power of at least 500 W, temporal duration in a range between 2 femtoseconds and 10 picosecond and repetition rate greater than 1 MHz, with pulses of energy in a range between 1 microjoules and 100 microjoules.

10. The system of claim 1, comprising a beam shaping optic, said beam shaping optic spatially modulating beams from the laser source to obtain an energy top hat distribution on the target.

11. The system of claim 1, wherein the separation unit comprises a magnetic separator.

12. The system of claim 1, wherein the target comprises one of: solids, gas and liquids.

13. The system of claim 1, wherein the target comprises one of: mineral ores, oxides, sulfides, and chemical wastes.

14. The system of claim 1, wherein the collecting unit comprises cup collectors.

15. A method for separation of elements of a target, comprising delivering successive pulses of same selected wavelength and bandwidth from a large bandwidth laser source of energy selected in a range between 1 and about 3 times a ionization threshold of elements of the target and generating beams of fixed central wavelength and bandwidth to the target to ionize elements of the target; submitting the ionised elements to an electric field; directing the ionized elements to a magnetic separator, and collecting ions species of the target separately.

16. The method of claim 15, comprising selecting an ion species as a reference and monitoring m/z separating efficiency using the reference.

17. The method of claim 15, comprising selecting a large bandwidth ultrashort pulsed laser source, delivering an energy on the target in a range between $10^{10}$ W/cm$^2$ and $10^{13}$ W/cm$^2$, of average power of at least 500 W, temporal duration in a range between 2 femtoseconds and 10 picosecond and repetition rate greater than 100 kHz, with pulses of energy in a range between 1 microjoules and 100 microjoules.

18. The method of claim 15, comprising selecting a large bandwidth ultrashort pulsed laser source, delivering an energy on the target in a range between $10^{10}$ W/cm$^2$ and $10^{13}$ W/cm$^2$, of average power of at least 500 W, temporal duration in a range between 2 femtoseconds and 10 picosecond and a repetition rate greater than 500 kHZ, with pulses of energy in a range between 1 microjoules and 100 microjoules.

19. The system of claim 1, wherein the laser source is an ultrashort pulsed laser source.

20. The method of claim 15, comprising selecting an ultrashort pulsed laser source.

\* \* \* \* \*